United States Patent
Weitze

(10) Patent No.: US 11,548,490 B2
(45) Date of Patent: Jan. 10, 2023

(54) VEHICLE BRAKING SYSTEM

(71) Applicant: Robert Bosch GmbH, Stuttgart (DE)

(72) Inventor: Thomas Weitze, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 331 days.

(21) Appl. No.: 16/612,615

(22) PCT Filed: May 16, 2018

(86) PCT No.: PCT/EP2018/062743
§ 371 (c)(1),
(2) Date: Nov. 11, 2019

(87) PCT Pub. No.: WO2018/219649
PCT Pub. Date: Dec. 6, 2018

(65) Prior Publication Data
US 2020/0198607 A1 Jun. 25, 2020

Related U.S. Application Data

(60) Provisional application No. 62/513,212, filed on May 31, 2017.

(51) Int. Cl.
*B60T 13/68* (2006.01)
*B60T 13/14* (2006.01)
(Continued)

(52) U.S. Cl.
CPC ........... *B60T 13/145* (2013.01); *B60T 8/17* (2013.01); *B60T 8/3205* (2013.01);
(Continued)

(58) Field of Classification Search
CPC .... B60T 13/662; B60T 13/686; B60T 13/745; B60T 8/175; B60T 8/4013;
(Continued)

(56) References Cited

U.S. PATENT DOCUMENTS 3,789,865 A 2/1974 Borman
5,911,484 A 6/1999 Hashida
(Continued)

FOREIGN PATENT DOCUMENTS

CN 102781740 A 11/2012
CN 105764759 A 9/2016
(Continued)

OTHER PUBLICATIONS

International Search Report and Written Opinion for Application No. PCT/EP2018/062743 dated Aug. 29, 2018 (14 pages).
(Continued)

*Primary Examiner* — Bradley T King
(74) *Attorney, Agent, or Firm* — Michael Best & Friedrich LLP

(57) ABSTRACT

A vehicle braking system (20) has a primary braking unit (22) with a first pressure generating unit (34) and a first reservoir (26). The vehicle braking system (20) further has a secondary braking unit (24) with a second pressure generating unit (52) and second reservoir (70). A method of operating the vehicle braking system (20) includes actuating the pressure generating unit (34) of the primary braking unit (22) thereby pressurizing a fluid at a wheel cylinder (30) to slow or stop the vehicle. The wheel cylinder (30) is depressurized in response to an electrical signal provided to an electronic control unit (100,102). The fluid is transferred from the wheel cylinder (30) to the second reservoir (70). The fluid path (PI) between the wheel cylinder (30) and the second reservoir (70) is shorter and has less fluid resistance than the fluid path (P2) between the wheel cylinder (30) and the first reservoir (26). The present invention further comprises two braking systems. The present inventions are intended for fast pressure depressurization at quick start or launch control.

12 Claims, 7 Drawing Sheets

(51) Int. Cl.
  *B60T 8/17* (2006.01)
  *B60T 8/32* (2006.01)
(52) U.S. Cl.
  CPC ......... *B60T 13/686* (2013.01); *B60T 2220/00* (2013.01); *B60T 2250/00* (2013.01); *B60T 2270/402* (2013.01)
(58) Field of Classification Search
  CPC ......... B60T 2270/402; B60T 2270/413; B60T 2270/89; B60W 10/188; B60W 30/1054; B60W 30/18118; B60W 30/18027
  See application file for complete search history.

(56) References Cited

U.S. PATENT DOCUMENTS

| | | | |
|---|---|---|---|
| 6,243,639 | B1 | 6/2001 | Hacussler et al. |
| 8,083,294 | B2 | 12/2011 | Crombez et al. |
| 8,271,172 | B2 | 9/2012 | Heller et al. |
| 9,174,616 | B2 * | 11/2015 | Taylor ................. B60T 8/26 |
| 9,308,905 | B2 | 4/2016 | Biller et al. |
| 9,517,759 | B2 | 12/2016 | Miyazaki et al. |
| 9,561,787 | B2 | 2/2017 | Quirant et al. |
| 9,637,102 | B2 | 5/2017 | Drumm et al. |
| 2012/0046844 | A1 * | 2/2012 | Okada ................. B60W 10/184 701/70 |
| 2013/0080016 | A1 * | 3/2013 | Bohn .................... B60T 13/662 701/78 |
| 2013/0304345 | A1 * | 11/2013 | Bohm ................... B60T 13/662 701/70 |
| 2014/0129107 | A1 * | 5/2014 | Taylor .................. B60T 8/172 701/70 |
| 2014/0159470 | A1 * | 6/2014 | Bareiss ................. B60T 7/042 303/10 |
| 2014/0225425 | A1 | 8/2014 | Drumm et al. |
| 2016/0039398 | A1 * | 2/2016 | Roll ..................... B60T 8/326 303/15 |
| 2016/0121865 | A1 * | 5/2016 | Foerch .................. B60T 7/042 303/10 |
| 2016/0152219 | A1 * | 6/2016 | Besier ................... B60T 7/042 303/15 |
| 2016/0200299 | A1 * | 7/2016 | Bohm ................... B60T 13/662 303/9.62 |
| 2017/0129469 | A1 | 5/2017 | Besier et al. |
| 2017/0274884 | A1 * | 9/2017 | Besier .................. B60T 13/142 |
| 2017/0282877 | A1 * | 10/2017 | Besier .................. B60T 13/142 |
| 2019/0337497 | A1 * | 11/2019 | Scheuerell ............. B60T 8/171 |
| 2020/0207321 | A1 * | 7/2020 | Plewnia ................ B60T 7/042 |

FOREIGN PATENT DOCUMENTS

| | | |
|---|---|---|
| JP | 2008087617 A | 4/2008 |
| WO | 2016012331 A1 | 1/2016 |
| WO | 2016096531 A1 | 6/2016 |
| WO | 2016096533 A1 | 6/2016 |
| WO | 2016139186 A1 | 9/2016 |

OTHER PUBLICATIONS

Chinese Patent Office Action for Application No. 201880035910.X dated May 7, 2021 (10 pages including statement of (relevance).
Japanese Patent Office Notice of Reasons for Refusal for Application No. 2019-566103 dated Nov. 10, 2020 (English translation, 4 pages).

* cited by examiner

VEHICLE BRAKING SYSTEM

CROSS-REFERENCE TO RELATED APPLICATIONS

This application claims priority to U.S. Provisional Patent Application No. 62/513,212, filed May 31, 2017, the entire contents of which are incorporated herein by reference.

BACKGROUND

The present disclosure relates to vehicle braking systems. In particular, the invention relates to a vehicle braking system including a primary braking unit and a secondary braking unit.

SUMMARY

In one aspect, a vehicle has a primary braking system with a first pressure generating unit and a first reservoir. The vehicle further has a secondary braking system with a second pressure generating unit and second reservoir. A method of operating the vehicle includes actuating the pressure generating unit of the primary braking system thereby pressurizing a fluid at a wheel cylinder to slow or stop the vehicle. The wheel cylinder is depressurized in response to an electrical signal provided to an electronic control unit. The fluid is transferred from the wheel cylinder to the second reservoir. A fluid path between the wheel cylinder and the second reservoir is shorter than a fluid path between the wheel cylinder and the first reservoir.

Further, in some embodiments, a vehicle condition indicative of a desired quick start is detected to generate the electrical signal prior to returning the fluid to the second reservoir.

Further, in some embodiments, the vehicle condition is one of a quick actuation of an accelerator or the use of a launch control mode.

Further, in some embodiments, the secondary braking system is positioned between the primary braking system and the wheel cylinder such that actuating the pressure generating unit of the primary braking system includes pressurizing the fluid from the primary braking unit through the secondary braking unit and to the wheel cylinder.

Further, in some embodiments, the fluid does not pass through the primary braking unit when transferring the fluid to the second reservoir.

Further, in some embodiments, transferring the fluid to the second reservoir includes opening an outlet switch valve between the reservoir and the wheel cylinder.

Further, in some embodiments, the fluid path between the wheel cylinder and the second reservoir includes an outlet switch valve of the secondary braking system positioned therebetween and the fluid path between the wheel cylinder and the first reservoir includes a separation valve of the secondary braking system positioned therebetween.

In another aspect, a vehicle braking system includes a wheel cylinder, a primary braking unit having a first reservoir and an electronically controlled pressure generating unit distinct from a master cylinder for actuating a braking action at the wheel cylinder in a primary mode of operation, and a secondary braking unit having a second reservoir and a pressure generating unit. The secondary braking unit is operable to actuate a braking action at the wheel cylinder in a secondary mode of operation. An electronic control unit is programmed to direct a fluid from the wheel cylinder to the second reservoir upon completion of the braking action in the primary mode of operation.

Further, in some embodiments, the electronic control unit includes a first electronic control unit operable to control the primary braking unit and a second electronic control unit operable to control the secondary braking unit.

Further, in some embodiments, the first and second electronic control units are programmed to communicate with one another to determine whether to direct the fluid from the wheel cylinder to the first reservoir or to the second reservoir.

Further, in some embodiments, the electronic control unit is programmed to direct the fluid from the wheel cylinder to the second reservoir upon completion of the braking action in the secondary mode of operation.

Further, in some embodiments, a distance between the first reservoir and the wheel cylinder is greater than a distance between the second reservoir and the wheel cylinder.

Further, in some embodiments, the vehicle braking system includes a sensor configured to detect a vehicle condition indicative of a desired quick start, wherein the electronic control unit is programmed to direct the fluid from the wheel cylinder to the second reservoir in response to the vehicle condition.

Further, in some embodiments, the secondary braking unit is positioned between the primary braking unit and the wheel cylinder such that the braking action in the primary mode of operation pressurizes the fluid from the primary braking unit through the secondary braking unit and to the wheel cylinder.

In yet another aspect, a vehicle braking system includes a wheel cylinder, a primary braking unit having a first reservoir and an electronically controlled pressure generating unit distinct from a master cylinder and operable to actuate a braking action at the wheel cylinder, and a secondary braking unit having a second reservoir and a pressure generating unit. The secondary braking unit is operable to actuate a braking action at the wheel cylinder. A first fluid path is defined between the first reservoir and the wheel cylinder, and passing through the master cylinder therebetween. A second fluid path is defined between the second reservoir and the wheel cylinder. An electronic device is configured to determine a vehicle condition indicative of a desired quick start and generate an electrical signal. An electronic control unit is programmed to direct a fluid from the wheel cylinder to the second reservoir via the second fluid path when the electrical signal indicates the desired quick start. The second fluid path is shorter than the first fluid path.

Further, in some embodiments, the vehicle condition is one of a quick actuation of an accelerator or the use of a launch control mode Further, in some embodiments, the vehicle braking system includes a first separation valve operable to transition between an open position and a closed position. The first separation valve is positioned in the first fluid path. The first separation valve is in the closed position when the second reservoir is operable to receive fluid from the wheel cylinder.

Further, in some embodiments, the vehicle braking system includes an outlet switch valve operable to transition between an open position and a closed position. The outlet switch valve is positioned in the second fluid path. The outlet switch valve is in the open position when the second reservoir is operable to receive fluid from the wheel cylinder.

Further, in some embodiments, the secondary braking unit is positioned between the primary braking unit and the wheel cylinder such that the first fluid path extends between the primary braking unit and the wheel cylinder, through the secondary braking unit.

Further, in some embodiments, the electronically controlled pressure generating unit of the primary braking unit is a plunger and the pressure generating unit of the secondary braking unit is a pump.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
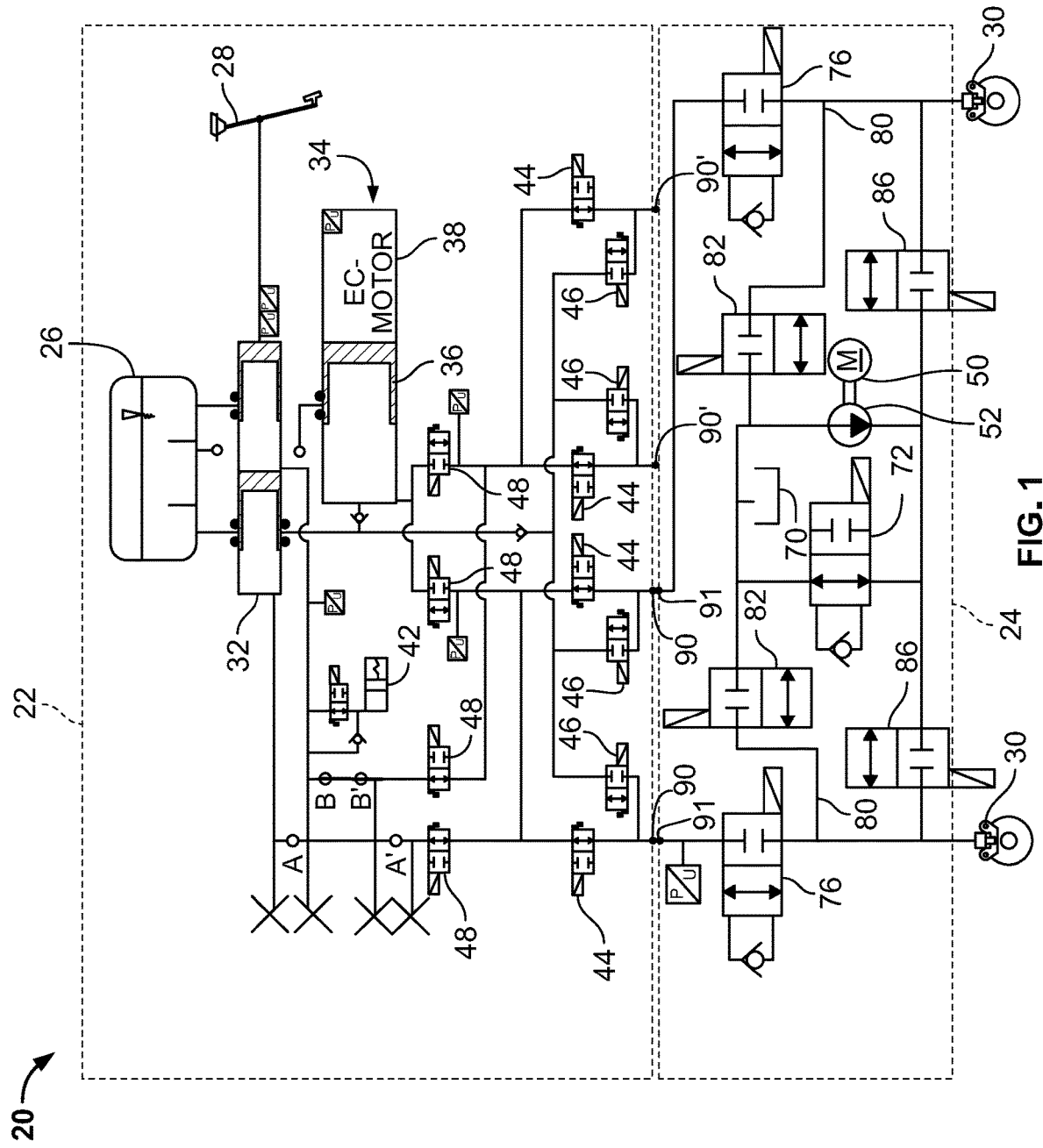
FIG. 1 is a schematic view of a vehicle braking system including a primary braking unit and a secondary braking unit.

FIG. 1 illustrates a vehicle braking system 20. The braking system 20 includes a primary braking unit 22 and a secondary braking unit 24 and a plurality of wheel cylinders 30. The secondary braking unit 24 includes a plurality of inlet ports 91, each inlet port 91 mounted to the primary braking unit 22 at one of a plurality of outlet ports 90 of the primary braking unit 22. For clarity, only one half of the secondary braking unit 24 is shown, with the other half of the secondary braking unit 24 connected to the primary braking unit 22 at outlet ports 90'. The second half of the secondary braking unit 24 mirrors the first half. The wheel cylinders 30 are connected to the primary braking unit 22 through the inlet ports 91 of the secondary braking unit 24 via the outlet ports 90, 90'.

The primary braking unit includes a fluid reservoir 26, an input device 28 such as a brake pedal, a master cylinder 32, and an electronically controlled pressure generating unit 34 operable to increase the fluid output from the primary braking unit 22 to the wheel cylinders 30. As shown, the electronically controlled pressure generating unit 34 is a plunger 36 driven by an electric motor 38 to displace fluid throughout the braking unit 22. The master cylinder 32 and electronically controlled pressure generating unit 34 are two fluid suppliers. The vehicle braking system 20 includes a third fluid supplier, a motor-driven pump 52 associated with each pair of wheel cylinders 30, which will be explained in greater detail below. The primary braking unit 22 further includes a pedal feel simulator 42. The simulator 42 is in selective communication with the master cylinder 32 to relay feedback to the input device 28 proportional to the force supplied by the user to the input device 28.

The primary braking unit 22 further includes a plurality of valves, specifically: inlet valves 44, outlet valves 46, and flow control valves 48. The flow control valves 48 are located downstream of the master cylinder 32 and regulate the flow from the master cylinder 32 to prevent, allow, or vary the flow to the inlet valves 44. The braking unit 22 shown in FIG. 1 includes four inlet valves 44 and four outlet valves 46, one of each valve 44, 46 associated with each of the wheel cylinders 30. The inlet valves 44 are located between the respective wheel cylinder 30 and the fluid suppliers. The outlet valves 46 are located between the wheel cylinder and atmospheric pressure at the reservoir 26. The valves 44, 46 are normally open control valves and normally closed control valves, respectively, and are selectively manipulated (opened and closed to varying degrees via feedback from sensors, etc.) to control aspects of braking such as an anti-lock braking system (ABS), traction control, or an electronic stability program (ESP).

The secondary braking unit 24 is located between the primary braking unit 22 and the wheel cylinders 30. More specifically, the secondary braking unit 24 is located between the wheel cylinders 30 and both fluid suppliers of the primary braking unit 22 (i.e., downstream of both the master cylinder 32 and the electronically controlled pressure generating unit 34). Further still, the secondary braking unit 24 is located between the inlet valves 44 and the wheel cylinders 30. Further still, the primary braking unit 22 includes the outlet ports 90, 90'. Each outlet port 90, 90' is associated with one of the wheel cylinders 30 and is downstream of all valving in the primary braking unit 22. The outlet ports 90, 90', may be physical outlets of the valve block defining the primary braking unit 22. The secondary braking unit 24 is mounted at the outlet ports 90.

The secondary braking unit 24 includes a motor 50 operable to drive the pump 52 (and an additional pump, not shown, associated with the other two wheel cylinders). Each pump 52 provides fluid to two of the wheel cylinders 30 (e.g., the first pump 52 provides fluid to the front wheel cylinders 30 and the second pump 54 provides fluid to the rear wheel cylinders). Fluid for the pump 52 is drawn from a secondary reservoir 70. The reservoir 70, as shown, is distinct from the reservoir 26, which offers advantages as described below.

A bleed-off valve 72 is located downstream of a discharge side of the pump 52, between the pump 52 and the reservoir 70. The bleed-off valve 72 is a pressure control valve operable to selectively open and bleed off some of the fluid from the pump 52. The bleed-off valve 72 is normally biased towards the open position but is closed or partially closed when the pump 52 is operated.

A separation valve 76 is positioned in the secondary braking unit 22 upstream of the respective wheel cylinder 30 and downstream of the respective outlet port 90, 90'. Each separation valve 76 is operable to permit or prohibit fluid flow from the primary brake unit 22 from reaching and actuating the respective wheel cylinder 30. The separation valves 76 are biased to the open position, thereby allowing fluid provided by actuation of the master cylinder 32 or electronically controlled pressure generating unit 34 to reach the respective wheel cylinders 30 in a normal input mode and a back-up input mode. However, when the pump 52 is actuated (e.g., in a non-driver-initiated mode), the separation valves 76 are closed to prohibit leakage of the fluid from the secondary braking unit 24 into the primary braking unit 22.

The secondary braking unit 24 further includes a return line 80 associated with each wheel cylinder 30. An outlet switch valve 82 is located in each return line 80. When the outlet switch valve 82 is in an open position, fluid from the respective wheel cylinder 30 passes through the return line 80 and to the reservoir 70. When the outlet switch valve 82 is in a closed position, fluid from the respective wheel cylinder 30 is unable to return to the reservoir 70.

A pump separation valve 86 is located between the discharge side of the pump 52 and each wheel cylinder 30. Each pump separation valve 86 is operable to transition between a closed position and a fully open position and can hold a plurality of open positions therebetween.

Figure 2:
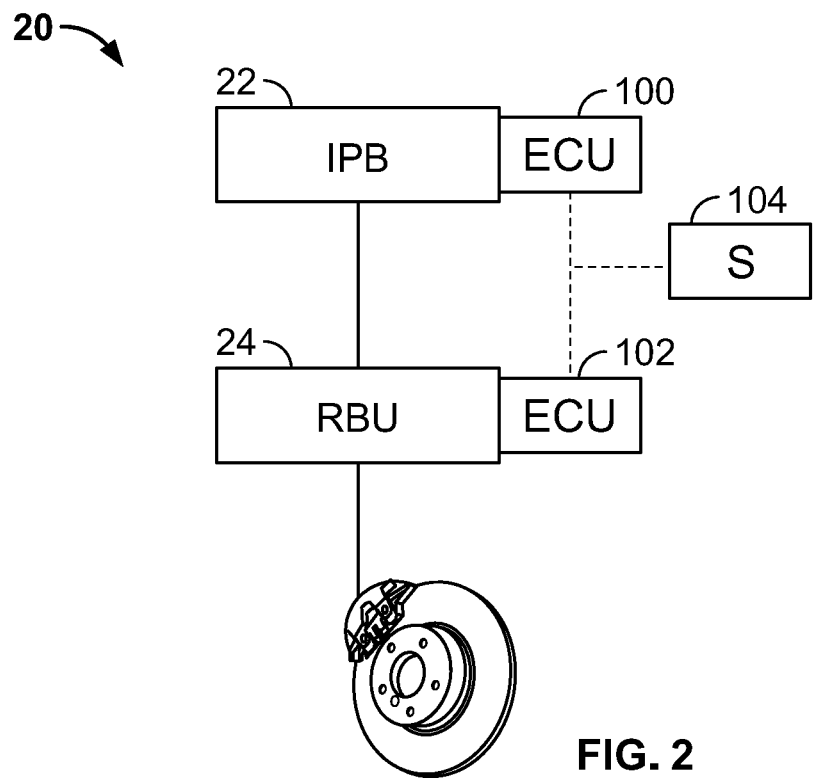
FIG. 2 is a schematic view of the primary and secondary braking units with their respective electronic control units.

The braking system 20 is operable in the normal input mode, the back-up input mode, and the non-driver-initiated mode. In the normal input mode, the user actuates the input device 28, thereby displacing fluid from the master cylinder 32. Via signals from a sensor (e.g., pressure sensor, pedal travel sensor, volumetric rate sensor, etc.), the motor 38 of the electronically controlled pressure generating unit 34 is actuated to drive the plunger 36, thereby displacing fluid volume. The separation valves 76 are open, thereby allowing the fluid pressure provided by the actuated electronically controlled pressure generating unit to build from the outlet ports 90, 90' of the primary braking unit 22, and then through the secondary braking unit 24, to provide braking at the wheel cylinders 30. If anti-lock braking, traction control, or stability control are needed, the inlet and outlet valves 44, 46 are manipulated via an electronic control unit (100; as shown in FIG. 2) to provide the requested control. The flow control valves 48 are closed, thereby prohibiting fluid from the master cylinder 32 from directly influencing the wheel cylinders 30. The pedal feel simulator 42 is in communication with the master cylinder 32 to provide feedback to the input device 28 and to the operator.

The back-up input mode is utilized when the operator provides an input to the input device 28 and the electronically controlled pressure generating unit 34 is incapable of providing a corresponding volume of fluid to the wheel cylinders 30. Such a scenario may occur, for example, if a sensor provides a signal outside of a predetermined range, or if the motor 38 is incapable of activating the plunger 36. In the back-up input mode, the valves 48 and the separation valves 76 are open to permit fluid from the master cylinder 32 to apply a braking force at the wheel cylinders 30.

The non-driver-initiated mode is utilized when the operator does not provide an input to the input device 28, but vehicle sensors determine that a braking action is required. For example, the non-driver-initiated mode is utilized to prevent a collision as part of an automatic braking system. In the non-driver-initiated mode, without input from the input device 28, the motor 50 is actuated to activate the pump 52 (and the pump associated with the other two wheel cylinders 30; not shown) thereby drawing fluid from the reservoir 70. The pump separation valves 86 are opened to an open position to permit fluid communication past the pump separation valves 86, and to the wheel cylinders 30. The bleed-off valve 72 may bleed off some of the fluid back to the reservoir 70. Therefore, the pump separation valve 86 and the bleed-off valve 72 control the amount of fluid pressure applied to the wheel cylinders 30. The separation valves 76 are closed to prevent the fluid used to actuate the wheel cylinders 30 from leaking into the primary braking system 22. Once the braking action is complete and the user desires vehicle movement once again (e.g., depresses and releases the input member 28, depresses an acceleration pedal, etc.), the outlet switch valves 82 open and fluid from the wheel cylinders 30 is vented through the return lines 80 to the reservoir 70. If the brake system 20 is actuated in the non-driver-initiated mode in a scenario where anti-lock braking, traction control, and/or stability control are required (e.g., snowy or slushy conditions, hydroplaning, etc.), the pump separation valves 86 can be selectively manipulated (opened and closed to varying degrees via feedback from sensors, etc.) to control the traction of each wheel of the vehicle.

As shown in FIG. 2, the primary braking unit 22 (labeled IPB for integrated power brake) includes a first electronic control unit 100 and the secondary braking unit 24 (labeled RBU for redundant braking unit) includes a second electronic control unit 102. The first and second electronic control units 100 are in communication with one another to improve braking relative to the operational modes described above. Specifically, by communicating with one another, the amount of time required to provide and relieve braking pressure at the wheel cylinders 30 is reduced.

The vehicle braking system 20 is modular such that a manufacturer or user may select a system that includes only the primary braking unit 22, or may select a system that includes both the primary braking unit 22 and the secondary braking unit 24, with the secondary braking unit physically mounting between the primary braking unit 22 and the wheel cylinders 30. However, in the normal input mode and the back-up input mode, the presence of the secondary braking unit 24 between the primary braking unit 22 and the wheel cylinders 30 presents additional channels and additional distance between the fluid suppliers and the wheel cylinders, thereby increasing the time required to modify the fluid pressure at the wheel cylinders 30.

Figure 3:
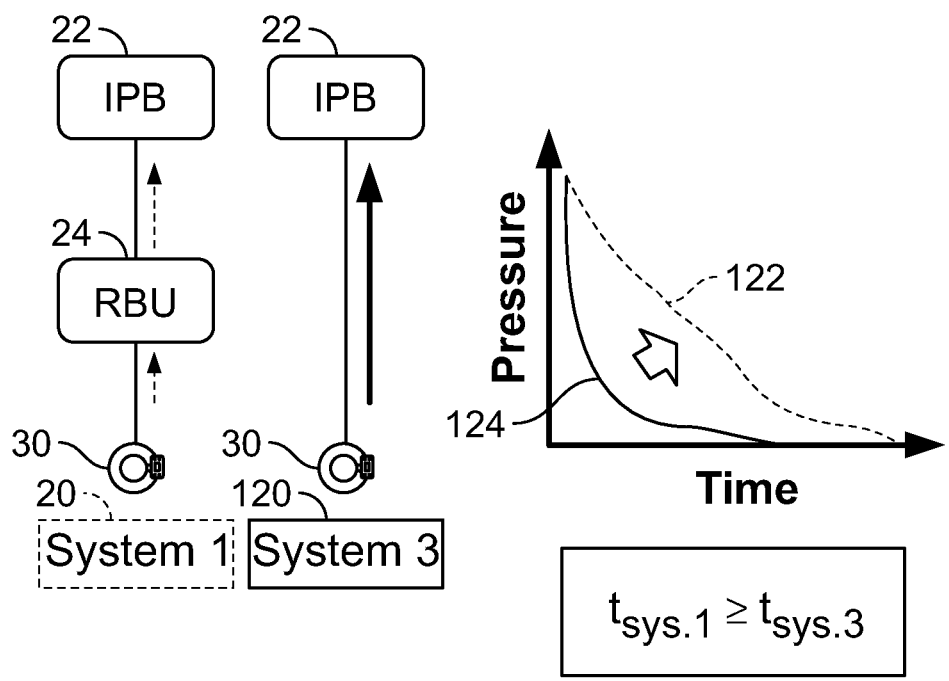
FIG. 3 is a visual comparison of pressure decrease versus time of the braking system of FIG. 1 relative to a system without the secondary braking unit.

As shown in FIG. 3, system 1 (illustrated on the graph with a dotted line 122) represents the vehicle braking system 20, as shown in FIG. 1, with the primary braking unit 22, the secondary braking unit 24, and a representative wheel cylinder 30 (of the four wheel cylinders in the actual system 20). System 3 (illustrated on the graph with a solid line 124) represents a system 120 in which the secondary braking unit 24 is left off, unused, and the outlet ports 90 of the primary braking unit 22 connect directly to the wheel cylinders (i.e., without a secondary braking unit located therebetween). As shown in the graph of FIG. 3, system 1 requires more time than system 3 to decrease the fluid pressure at the wheel cylinders 30 from a first braking pressure (i.e., in which the wheel cylinders 30 produce a braking force to stop or slow the vehicle at a predetermined rate) to a second braking pressure (i.e., in which the wheel cylinders 30 produce little to no braking force to stop or slow the vehicle).

Figure 4:
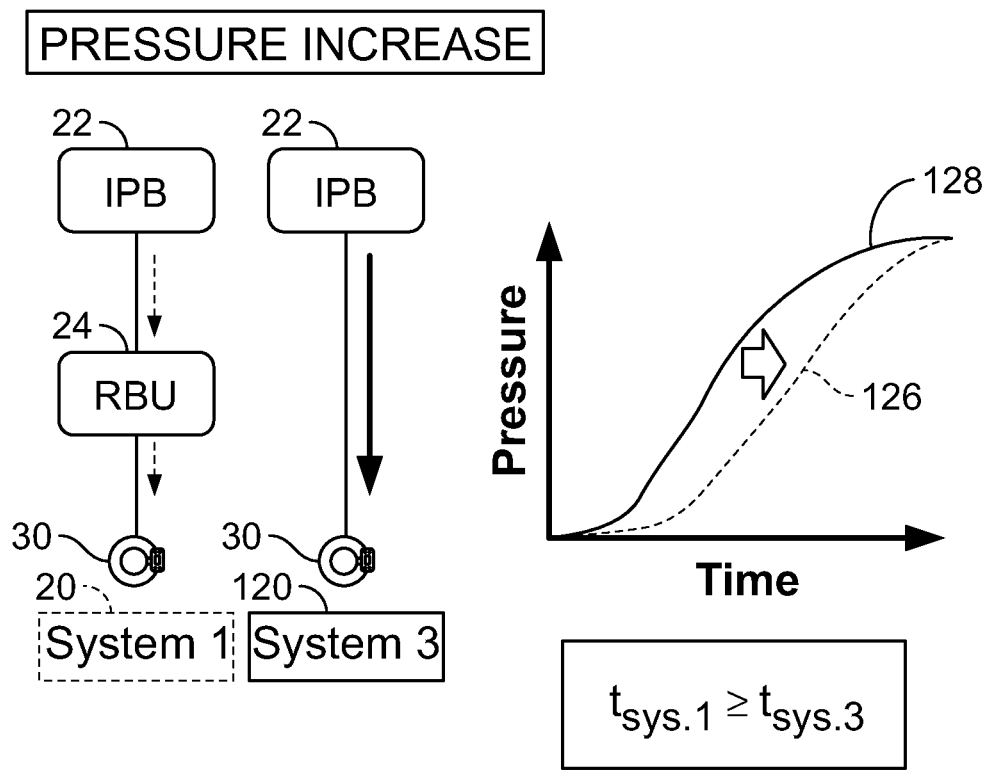
FIG. 4 is a visual comparison of pressure increase versus time of the braking system of FIG. 1 relative to a system without the secondary braking unit.

Similar to FIG. 3, FIG. 4 illustrates a comparison between system 1 and system 3. System 1 is illustrated on the graph with a dotted line 126 and system 3 is illustrated with a solid line 128. In contrast to FIG. 3, which illustrates the time required for fluid pressure to return to steady state after a braking action is complete, FIG. 4 illustrates the time required for fluid pressure to reach a predetermined pressure at the wheel cylinders 30. The time required to provide a braking pressure at the wheel cylinders 30 is increased with the inclusion of the secondary braking system 24. More specifically, system 1 requires more time than system 3 to increase the fluid pressure at the wheel cylinders 30 from a third braking pressure (i.e., in which the wheel cylinders 30 produce little to no braking force to stop or slow the vehicle)

to a fourth braking pressure (i.e., in which the wheel cylinders 30 produce a braking force to stop or slow the vehicle at a predetermined rate). The third braking pressure may be equivalent to the second braking pressure and the fourth braking pressure may be equivalent to the first braking pressure.

In order to reduce the time required to decrease (FIG. 3) or increase (FIG. 4) system pressure within the braking system 20, the first and second electronic control units 100, 102 communicate with one another to provide shorter paths for the fluid flow, thereby decreasing the time required to increase/decrease the fluid pressure at the wheel cylinders 30.

Figure 5A:
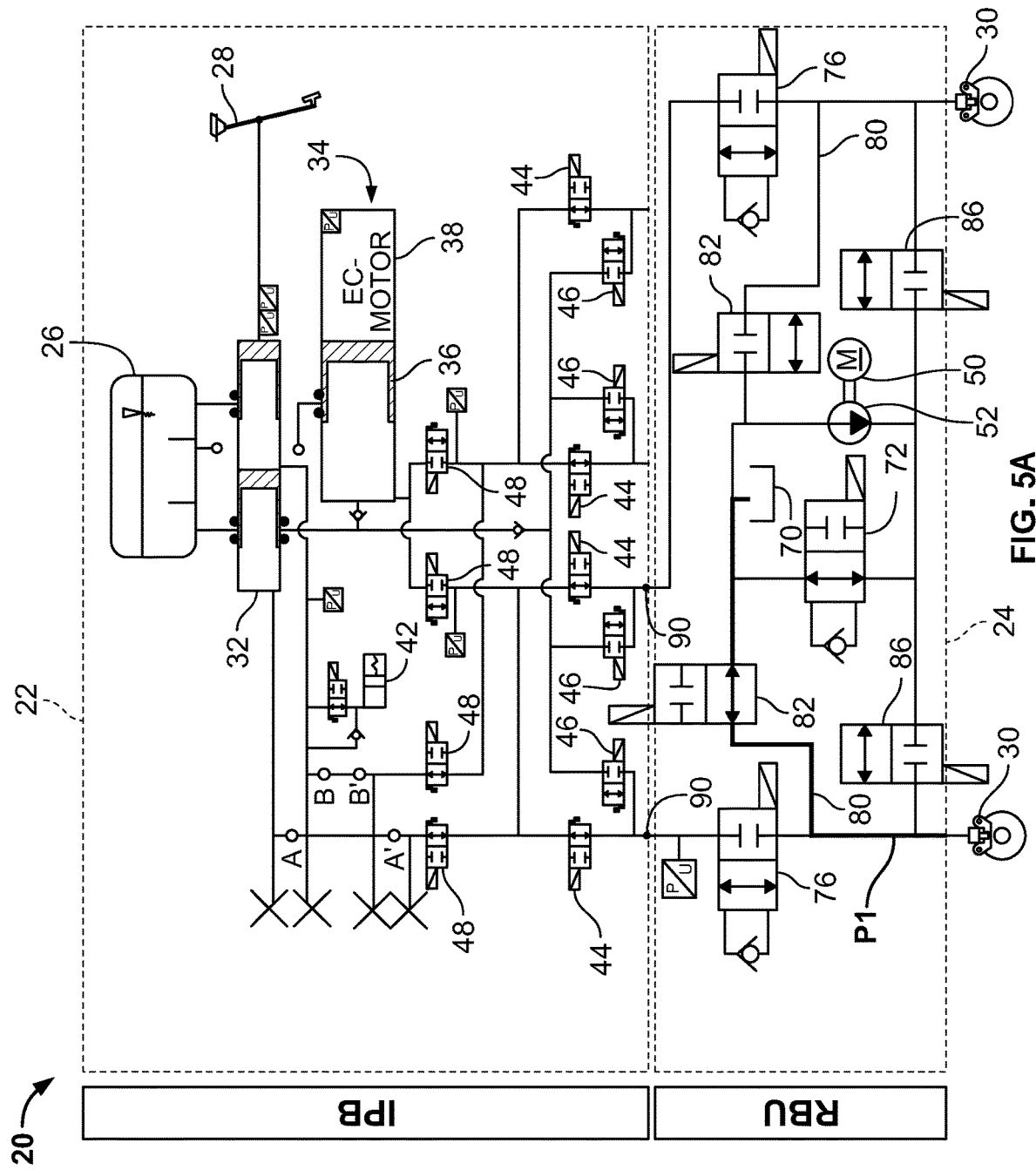
FIG. 5A is a schematic view of the vehicle braking system of FIG. 1, as controlled by the electronic control units to utilize the secondary braking unit as a fluid return path.

As shown in FIG. 5A, the wheel cylinders 30 have completed a braking action and the pressure at the wheel cylinders 30 is at the first braking pressure (FIG. 3). The first electronic control unit 100 (FIG. 2) determines (via input from sensors 104 or other electronic devices capable of generating an electrical signal, etc.) that the present scenario requires that the rate of pressure decrease be greater than achievable by the braking system 20 (see dashed line 122) in normal operation (i.e., where fluid returns to the reservoir 26 along the fluid return path as designated by bolded line P1 shown in FIG. 5B). In such a scenario, a vehicle sensor 104 or other electronic device senses or determines a vehicle condition indicative of a desired quick start and generates a corresponding electrical signal. Such a scenario may be, for example, a high rate of accelerator application (e.g., a quick depression of a gas pedal) or the use of a launch control mode. Therefore, the electrical signal indicates that the vehicle condition is met and may be generated based on a passively detected measurement (e.g., via the sensor 104) or by a user actuated input. In order to accommodate a greater rate of pressure decrease, the first electronic control unit 100 instructs the second electronic control unit 102 to open the outlet switch valve 82, thereby providing some or all of the pressurized fluid at the wheel cylinder 30 to the reservoir 70 of the secondary braking system 24 (along the fluid return path as designated by bolded line P2 shown in FIG. 5A). As this return path P2 is a shorter path than the return path P1 from the wheel cylinder 30 through the separation valve 76, outlet valve 46, and the master cylinder 32 to the reservoir 26 of the primary braking unit, the time required for the pressure to decrease is greatly decreased. The reservoir 70 may be connected to the reservoir 26 of the primary braking unit 22 to relay the fluid back to the primary reservoir 70. Alternatively, the electronic control units 100, 102 may record the amount of fluid in each reservoir 26, 70 (e.g., via level sensors in communication with the electronic control units 100, 102) and selectively utilize the various fluid movers based on the location of fluid and the demand for expedient pressure decreases/increases.

As shown in FIG. 5A, the fluid return path P1 extends between the wheel cylinder 30 and the second reservoir 70. For simplicity, the fluid return path P1 is only illustrated with respect to one of the wheel cylinders 30. Within the context of this application, the term "return path" does not necessarily refer to a path where the fluid returns to its origin, but instead, refers to the evacuation path from the wheel cylinder, which may terminate at the originating reservoir 26, 70, or may terminate at another reservoir 26, 70. The fluid return path P1 extends from the wheel cylinder 30, through the open outlet switch valve 82 and to the reservoir 70 of the secondary system 24. The separation valve 76 is closed to prevent the fluid from returning to the reservoir 70 of the primary braking unit 22. Alternatively, the outlet switch valve 82 and the separation valve 76 may both be in open positions to simultaneously allow fluid to drain to both reservoirs 26, 70.

Figure 5B:
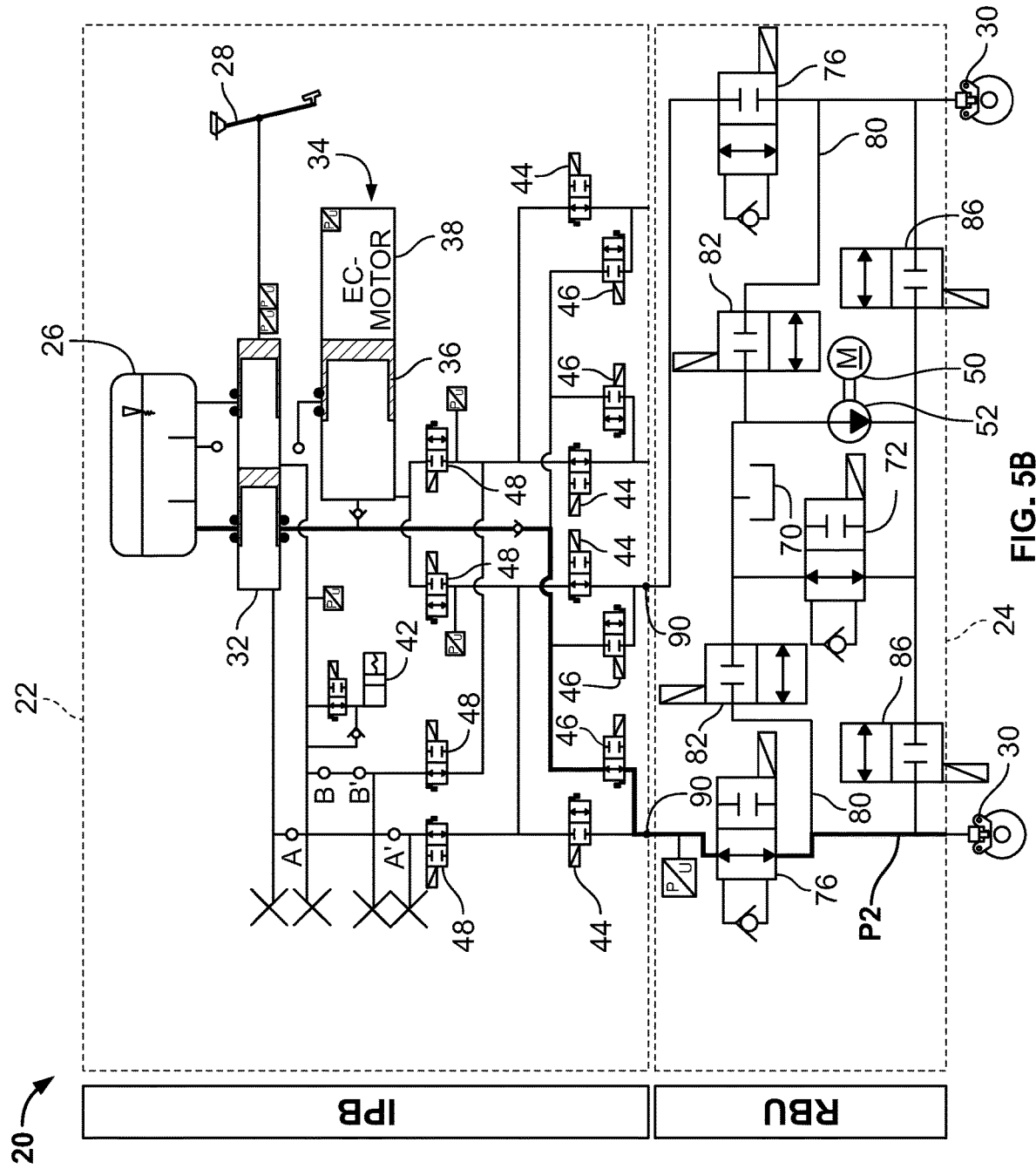
FIG. 5B is a schematic view of the vehicle braking system of FIG. 1, as controlled by the electronic control units to utilize the primary braking unit as a fluid return path.

As shown in FIG. 5B, the fluid return path P2 extends between the wheel cylinder 30 and the first reservoir 26. For simplicity, the fluid return path P2 is only illustrated with respect to one of the wheel cylinders 30. The fluid return path P2 extends from the wheel cylinder 30, and through the open separation valve 76, returning to the primary braking unit 22 via the outlet port 90. Once within the primary braking unit, the fluid return path P2 may extend through the outlet valve 46, or may alternatively pass through an open inlet valve 44 and flow control valve 48, returning to the reservoir 26 via the master cylinder 32. In some embodiments, the fluid return path P2 may also extend through the electronically controlled pressure generating unit 34.

Figure 6:
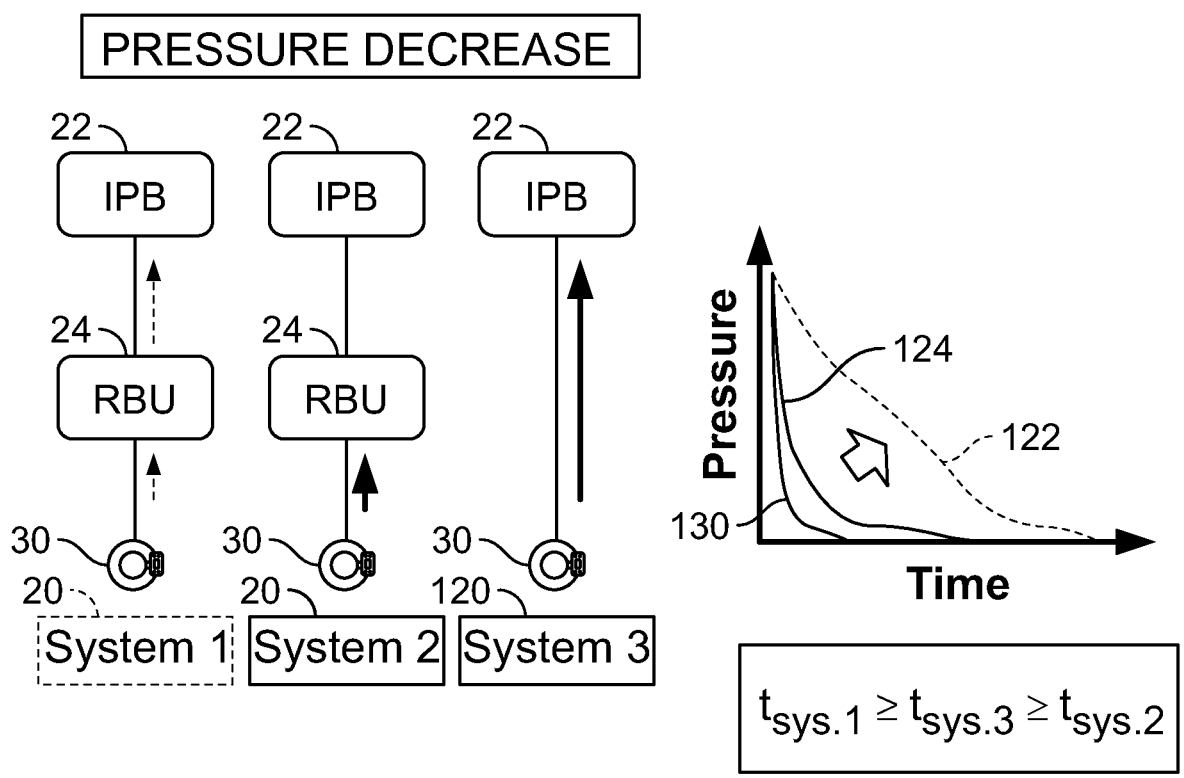
FIG. 6 is a visual comparison of pressure decrease versus time of the braking systems of FIGS. 1, 5A and 5B relative to a system without the secondary braking unit.

FIG. 6 illustrates and graphs system 1 and system 3, similar to FIG. 3, and further illustrates system 2, which is schematically the same as system 1, but is controlled via communication of the first and second electronic control units 100, 102, as discussed above with respect to FIG. 5A. System 2 is illustrated via solid line 130 on the graph. As shown, with the shorter fluid path from the wheel cylinder 30, past the open outlet switch valve 82 and to the reservoir 70 of the secondary system 24, the time required to decrease the pressure from the first pressure to the second pressure is less than required in system 1. Further, with the cooperative use of the primary and secondary braking units 22, 24, the time required to decrease the pressure from the first pressure to the second pressure is less than required in system 3, which does not include the secondary braking unit 24.

Referring once again to the schematics of FIGS. 1, 2, 5A and 5B, the electronic control unit 100 may determine (via inputs from sensors 104, etc.) that the present scenario requires that the rate of pressure increase be greater than normally applied by the primary braking unit 22 (i.e., provided by either the master cylinder 32 or the electronically controlled pressure generating unit 34). Such a scenario may occur, for example, to avoid a collision or in response to a quick application of the input device 28. In order to accommodate a greater rate of pressure increase (i.e., decrease the time required to increase from the third pressure to the fourth pressure), the first electronic control unit 100 instructs the second electronic control unit 102 to actuate the motor 50 and the pump 52 and open pump separation valve 86, thereby providing additional pressurized fluid to the wheel cylinder 30 from the pump 52. The primary and secondary braking units 22, 24 may be utilized in succession (i.e., one of the braking units 22, 24 provides increased fluid pressure at the wheel cylinder 30, then the other of the braking units 22, 24 provides increased fluid pressure at the wheel cylinder 30). For example, the master cylinder 32 or the electronically controlled pressure generating unit 34 may be actuated first. After some time, the separation valve 76 may be closed to hold fluid pressure from the master cylinder or electronically controlled pressure generating unit 34 at the wheel cylinder 30 prior to activation of the motor 50 and pump 52. Therefore, as controlled by the electronic control units 100, 102, the primary braking unit 22 and the secondary braking unit 24 operate in succession to achieve faster braking. Communicating with one another, the electronic control units 100, 102 are operable to decrease the time required to provide the fourth braking pressure at the wheel cylinders 30 by providing hybrid braking of the primary and secondary braking units 22, 24.

Figure 7:
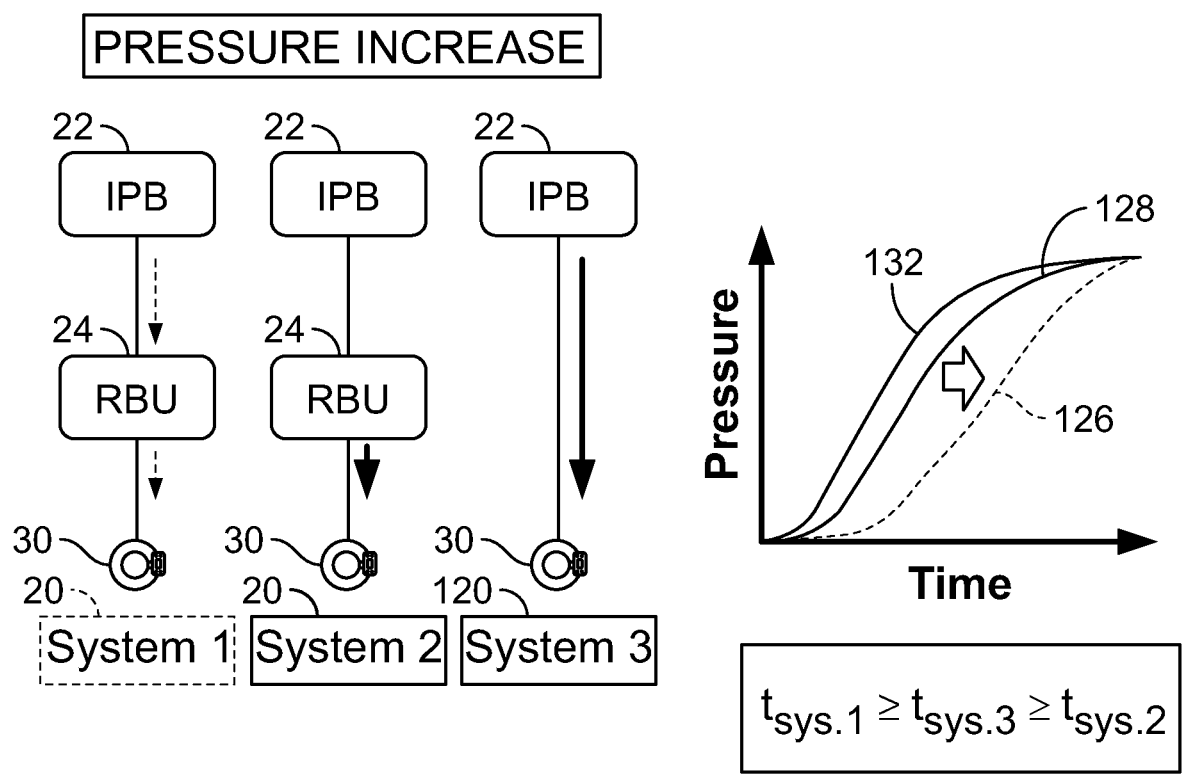
FIG. 7 is a visual comparison of pressure increase versus time of the braking systems of FIGS. 1, 5A, and 5B relative to a system without the secondary braking unit.

FIG. 7 illustrates system 1, system 2, and system 3, similar to FIG. 6, except with the direction of flow reversed.

Once again, system 2 refers to a system schematically similar to system 1, but controlled by the electronic control units 100, 102 as described above. System 2 is illustrated via solid line 132 on the graph, relative to dotted line 126 (system 1) and solid line 128 (system 3) as previously illustrated in FIG. 4. As shown in the graph of FIG. 7, utilizing the hybrid braking method of system 2 is capable of increasing from the third pressure to the fourth pressure in less time than either of system 1 or system 3, thereby providing a braking system 20 capable of providing faster braking times, decreasing the overall stopping distance of the vehicle.

What is claimed is:

1. A vehicle braking system comprising:
    a wheel cylinder;
    a primary braking unit having a first reservoir and an electronically controlled pressure generating unit distinct from a master cylinder for actuating a braking action at the wheel cylinder in a primary mode of operation;
    a secondary braking unit having a second reservoir and a pressure generating unit, wherein the secondary braking unit is operable to actuate a braking action at the wheel cylinder in a secondary mode of operation; and
    an electronic control unit programmed to direct a fluid, pressurized at the wheel cylinder from the pressure generating unit of the primary braking unit, to the second reservoir in response to an electrical signal to cease the braking action in the primary mode of operation; and
    a sensor configured to detect a vehicle condition indicative of a desired quick start,
    wherein the electronic control unit is programmed to direct the fluid from the wheel cylinder to the second reservoir in response to the vehicle condition.

2. The vehicle braking system of claim 1, wherein the electronic control unit includes a first electronic control unit operable to control the primary braking unit and a second electronic control unit operable to control the secondary braking unit.

3. The vehicle braking system of claim 2, wherein the first and second electronic control units are programmed to communicate with one another to determine whether to direct the fluid from the wheel cylinder to the first reservoir or to the second reservoir.

4. The vehicle braking system of claim 1, wherein the electronic control unit is programmed to direct the fluid from the wheel cylinder to the second reservoir upon completion of the braking action in the secondary mode of operation.

5. The vehicle braking system of claim 1, wherein a distance of a fluid path between the first reservoir and the wheel cylinder is greater than a distance of a fluid path between the second reservoir and the wheel cylinder.

6. The vehicle braking system of claim 1, wherein the secondary braking unit is positioned between the primary braking unit and the wheel cylinder such that a fluid path for completing the braking action in the primary mode of operation extends from the primary braking unit through the secondary braking unit and to the wheel cylinder.

7. A vehicle braking system comprising:
    a wheel cylinder;
    a primary braking unit having a first reservoir and an electronically controlled pressure generating unit distinct from a master cylinder and operable to actuate a braking action at the wheel cylinder; and
    a secondary braking unit having a second reservoir and a pressure generating unit, wherein the secondary braking unit is operable to actuate a braking action at the wheel cylinder;
    a first fluid path defined between the first reservoir and the wheel cylinder, and passing through the master cylinder therebetween;
    a second fluid path defined between the second reservoir and the wheel cylinder, wherein the second fluid path is shorter than the first fluid path;
    an electronic device configured to determine a vehicle condition indicative of a vehicle driver's desired quick start and generate an electrical signal; and
    an electronic control unit programmed to select the second fluid path for depressurizing the wheel cylinder, regardless of an immediately preceding braking action being actuated by the primary braking unit or the secondary braking unit, when the electrical signal indicates the desired quick start.

8. The vehicle braking system of claim 7, wherein the vehicle condition is one of a quick actuation of an accelerator or the use of a launch control mode.

9. The vehicle braking system of claim 7, further comprising a first separation valve operable to transition between an open position and a closed position, the first separation valve positioned in the first fluid path, wherein the electronic control unit is programmed to place the first separation valve in the closed position when the electrical signal indicates the desired quick start.

10. The vehicle braking system of claim 9, further comprising an outlet switch valve operable to transition between an open position and a closed position, the outlet switch valve positioned in the second fluid path, wherein the electronic control unit is programmed to place the outlet switch valve in the open position when the electrical signal indicates the desired quick start.

11. The vehicle braking system of claim 7, wherein the secondary braking unit is positioned between the primary braking unit and the wheel cylinder such that the first fluid path extends between the primary braking unit and the wheel cylinder, through the secondary braking unit.

12. The vehicle braking system of claim 7, wherein the electronically controlled pressure generating unit of the primary braking unit is a plunger and the pressure generating unit of the secondary braking unit is a pump.

* * * * *